United States Patent [19]

Garguilo

[11] Patent Number: 5,673,888
[45] Date of Patent: Oct. 7, 1997

[54] DEVICE FOR FIXING AN OBJECT TO A SUPPORT

[75] Inventor: Armand Garguilo, St. Priest, France

[73] Assignee: Datec, St. Priest, France

[21] Appl. No.: 624,098

[22] Filed: Mar. 29, 1996

[30] Foreign Application Priority Data

Apr. 5, 1995 [FR] France ................... 95 04291

[51] Int. Cl.⁶ .................. A47B 96/06; F16L 3/08
[52] U.S. Cl. ................ 248/228.3; 248/226.11; 248/231.41
[58] Field of Search .................. 248/689, 219.3, 248/226.11, 227.1, 228.1, 228.2, 228.3, 228.5, 228.6, 231.21, 231.31, 231.41, 231.61, 231.71, 230.2, 230.3; 5/503.1, 658, 416

[56] References Cited

U.S. PATENT DOCUMENTS

| | | | |
|---|---|---|---|
| 222,086 | 11/1879 | Slemmer | 248/227.1 |
| 768,819 | 8/1904 | Palmer | 248/231.61 X |
| 1,906,369 | 5/1933 | Christie | 5/503.1 X |
| 3,180,605 | 4/1965 | Ewaskowitz, Jr. | 248/231.41 X |
| 3,240,455 | 3/1966 | Swezy et al. | 246/231.41 X |
| 4,593,422 | 6/1986 | Wolpert, Jr. et al. | 5/503.1 |
| 5,352,078 | 10/1994 | Nasu | 248/228.3 X |

*Primary Examiner*—Leslie A. Braun
*Assistant Examiner*—Stephen S. Wentsler
*Attorney, Agent, or Firm*—Oliff & Berridge

[57] ABSTRACT

A device for fixing an object to a support in accordance with the invention includes a housing having a first wall that defines a channel and a second wall extending from the first wall at an angle. A member has a first section that defines a hole and a second section that extends from the first section at an angle. The member is disposed relative to the housing such that the channel and the hole form a contiguous passage. A lever is pivotally attached to the housing and is movable between a nonobstructing position wherein the first section of the member is movable along the first wall of the housing and the object is movable through the passage, and a locked position wherein the first section of the member is secured to the first wall of the housing and the object is locked in position within the passage.

15 Claims, 3 Drawing Sheets

5,673,888

DEVICE FOR FIXING AN OBJECT TO A SUPPORT

BACKGROUND OF THE INVENTION

The present invention relates to a device for fixing an object to a support.

This device may be used for fixing any type of object to any type of support. It is particularly intended for fixing the shaft of an umbrella to a baby carriage or for fixing the post supporting netting to a crib, bun may have many other applications, for example fixing a board to the longitudinal member of a bed.

In the absence of any appropriate fixing device, mounting an object on a support poses problems, especially when the object is relatively long meaning that its center of gravity is high with respect to the support.

DESCRIPTION OF THE PRIOR ART

There is a fixing device in existence which comprises a mounting plate through which a clamping screw passes, and this in particular is fitted to some desk This device has the drawback of being relatively difficult to adjust, and of not being suitable for the various types of support which may be encountered.

Furthermore, to ensure that an elongate object is fixed firmly to its support, this device requires the screw to be tightened a great deal, which to varying degrees marks and damages the support. Tightening the screw or slackening it off when removing the object or altering the position of this object are operations which are relatively lengthy and difficult to accomplish.

SUMMARY OF THE INVENTION

The present invention aims to overcome all of these drawbacks by providing a fixing device which can easily and quickly be fitted to any type of support, which is easy and quick to adjust and which makes it possible to mount the object on the support in an entirely reliable fashion, especially when this object, once fixed, has a high center of gravity relative to the support.

To this end, the fixing device according no the invention comprises:

a housing having a first wall and a second wall;

an L-shaped component designed to be engaged in the housing with the possibility of sliding along said first wall, the short branch of this component forming, with said second wall, a jaw capable of being engaged of clamping the support;

an opening made in the first wall of the housing even with the second wall for engaging part of the object to be fixed along this second wall, and a lever mounted in pivoting manner on the housing, this lever, when in a nonobstructing position, allowing the L-shaped component to slide along said first wall and allowing that part of the object which is engaged in the housing through the opening to slide along said second wall and, when it is in a locked position, allowing on the one hand the L-shaped component to be clamped between it and said first wall and on the other hand allowing that part of the object which is engaged in the housing to be clamped between it and said second wall.

When the lever is in the nonobstructing position, the L-shaped component can slide with respect to the housing, this making it possible to customize the with of the jaw formed by the short branch of the L-shaped component and said second wall of the housing to suit the width of the support chosen for the component to be mounted on.

With the lever in this same position, the object to be fixed can move with respect to the housing and may thus be adjusted in terms of position relative to the device.

When the width of the jaw has been adjusted so that it clamps the support and the object to be fixed has been placed at the desired height relative to be fixing device, the lever is pivoted into its locking position, which simultaneously allows the L-shaped component to be immobilized relative to the housing, and thus the jaw to be held clamped on the support, and the object to be immobilized relative to the fixing device, at the desired height.

As a preference, said second wall has pads made of an elastic material with a high coefficient of friction of each of its faces, that is to say on the jaw side and on the same side as the object to be fixed. These pads make it possible to ensure that the support is immobilized in the jaw and that the object is immobilized relative to the housing.

According to a preferred embodiment of the invention, the lever comprises, on the one hand, a cam-shaped end which is shaped so as to allow the L-shaped component to slide when the lever is in the nonobstructing position and so as to clamp this L-shaped component between it and said first wall when the lever is in the locked position, and, on the other hand, a wall which is shaped to come into engagement with that part of the object which is engaged in the housing.

Advantageously, said first wall of the housing and that face of the L-shaped component which comes into contact with this wall each include a series of striations oriented perpendicularly to the axis of sliding of the L-shaped component, these striations being complementary between one series and the other, that is to say being able to be engaged in one another to define a series of stable positions of the L-shaped component with respect to said first wall of the housing.

These striations make it possible to ensure that the L-shaped component is perfectly immobilized relative to the housing when the lever is in the locked position.

BRIEF DESCRIPTION OF THE DRAWINGS

To make it easy to understand, the invention is described again hereinbelow with reference to the attached diagrammatic drawing which represents, by way of nonlimiting example, one preferred embodiment of the fixing device to which it relates.

DESCRIPTION OF THE PREFERRED EMBODIMENTS

The figures represent, from various angles, a device 1 for fixing an object 2 to a support 3.

Figure 2:
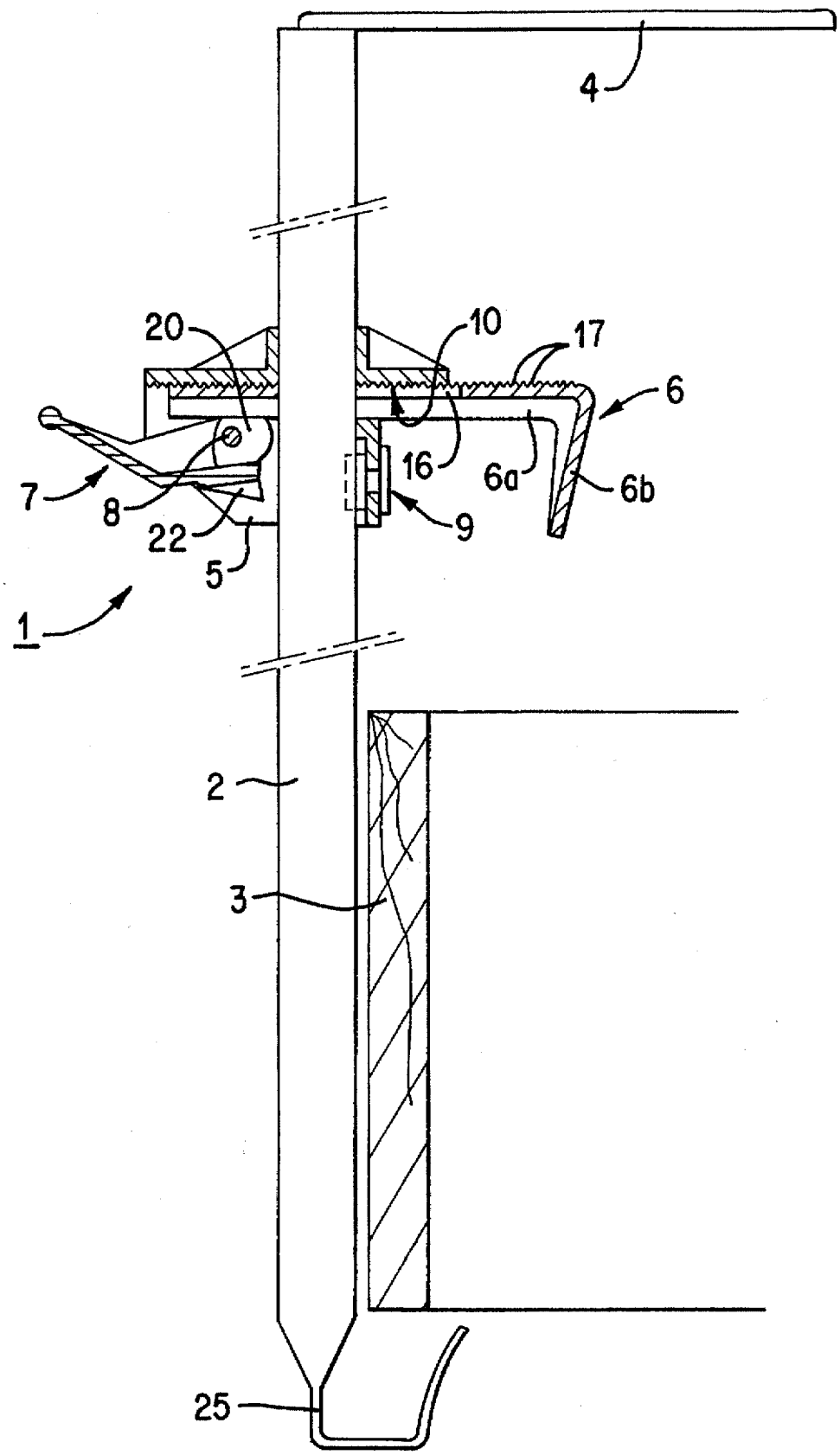
FIG. 2 is a longitudinal sectional view thereof with the object to be fixed and the support, before mounting

In th example represented in FIG. 2, the support 3 is a longitudinal member of a crib and the object to be fixed is a post 2 supporting netting (not represented) by virtue of a removable top ring 4 which it has.

Figure 1:
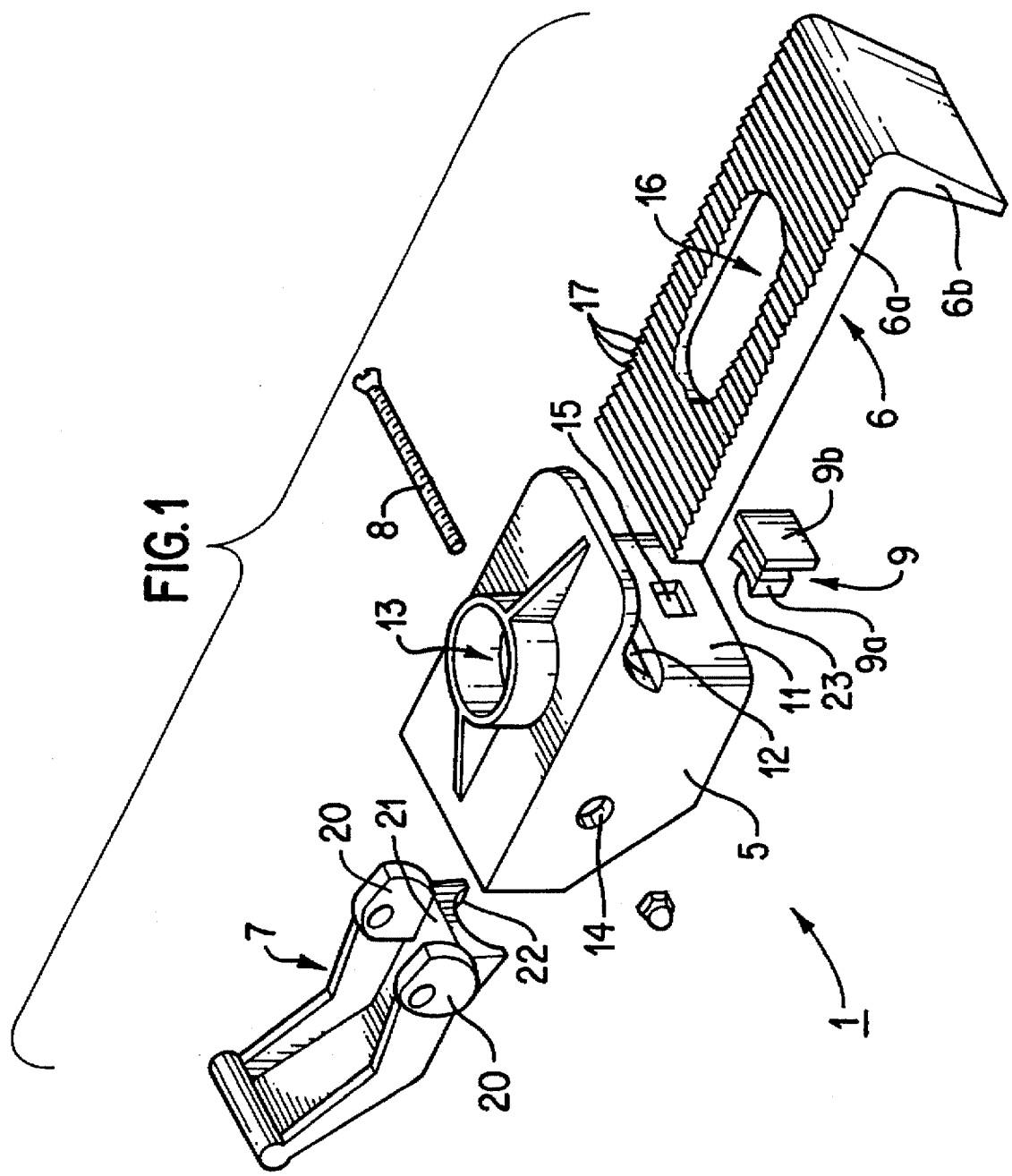
FIG. 1 is an explode perspective view thereof.

As FIG. 1 specifically shows, the device 1 comprises a housing 5, an L-shaped component 6 that can be engaged and slide in this housing 5, a lever 7 mounted so that it can pivot about a screw 8 passing through the housing 5 and a pad of elastic material 9.

The housing 5 comprises:
- a first wall 10 and a second wall 11 which are perpendicular to each other and define an opening 12 between them;
- an opening 13 formed in said first wall 10, such that an axis of the opening 13 is parallel to a plane defined by the second wall 11;
- two coaxial holes 14 for the screw 8 to pass through and a hole 15 made in the wall 11.

The face of the wall 10 situated on the inside of the housing 5 has a series of striations parallel to the opening 12.

The L-shaped component 6 has a main branch 6a and a short branch 6b. The branch 6a has an oblong opening 16, of the same width as the opening 13, and a series of striations 17 oriented perpendicularly to the axis of this main branch 6a. These striations 17 complement those of the wall 10, that is to say can be engaged in the latter ones, and vice versa, when the branch 6a of the component 6 is engaged in the housing 5.

The lever 7 comprises, on the one hand, at one end, two shaped parts 20 in the form of cams and, on the other hand, a central wall 21 which has a semi-cylindrical profile 22, of diameter slightly greater than that of the post 2. This lever 7, once mounted in the housing 5 by means of the screw 8, can pivot between two positions, namely a nonobstructing position represented in FIG. 2 and a locked position represented in FIG. 3.

The pad 9 of elastic material has two end parts 9a, 9b connected by a central part.

The part 9a comprises a semi-cylindrical cavity 23, of diameter slightly greater than that of the post 2, and external dimensions slightly greater than those of the hole 15 but which are such that this part 9a can, by elastic deformation, be engaged through this hole 15. The part 9b has a purely parellelepipedal shape and the central part has a length corresponding substantially to the thickness of the wall 11 and a section corresponding substantially to that of the hole 15.

Figure 3:
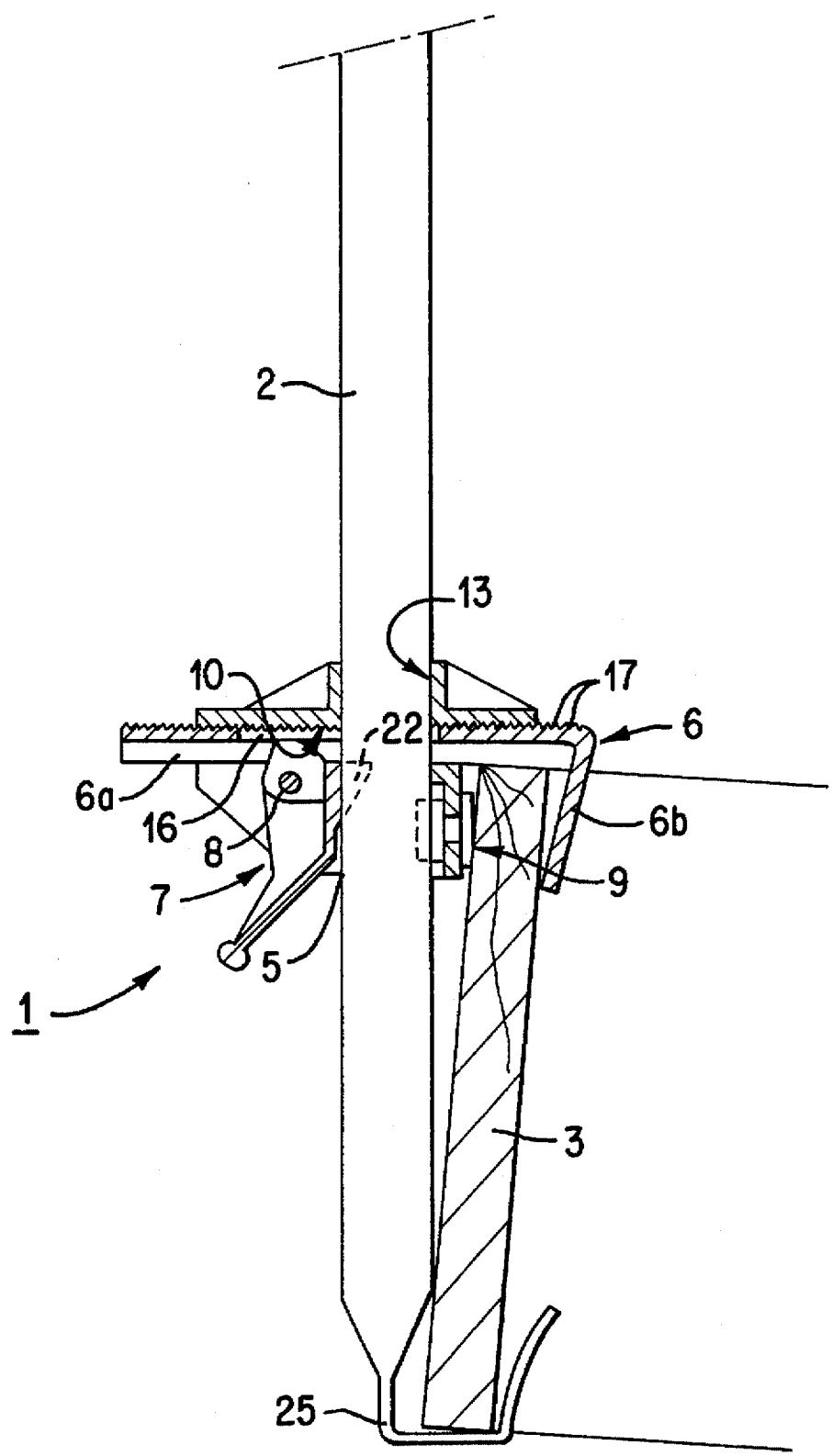
FIG. 3 is a view similar to FIG. 2, after mounting.

As FIGS. 2 and 3 show, the part 9a of the pad 9 is engaged through the hole 15 by elastic deformation. Once it has got through this hole, it resumes its initial shape, which allows the pad 9 to be mounted on the wall 11.

As is clear in FIGS. 1 and 3, the main branch 6a of the component 6 is engaged in the housing 5 through the opening 12 and slides along said first wall 10.

The short branch 6b of this component 6 forms, with said second wall 11, a jaw which can be engaged and find purchase on the longitudinal member 3.

When the lever 7 is in the nonobstructing position represented in FIG. 2, the L-shaped component 6 can slide relative to the housing 5, this making it possible to customize the width of this jaw to suit the width of the longitudinal member 3.

The post 2 is intended to be engaged through the opening 13 and the slot 16 in the component 6. Since this opening 13 is formed even with the wall 11, and as a result of the positioning of the lever 7, the post 2 can, when engaged in this opening 13, be inserted between the part 9a of the pad 9 and the profiled part 22 of the lever 7.

When the latter is in the nonobstructing position, the post 2 can slide freely through the opening 13.

As FIG. 2 shows, the post 2 is bent over at its lower end so that it forms a hook 25 which can be engaged around the lower part of the longitudinal member 3.

Thus, when the width of the aforementioned jaw has been adjusted so that it grips the upright 3, and the hook 25 of the post 2 has been engaged around the lower part of the longitudinal member 3, the lever 7 is pivoted into its locked position represented in FIG. 3.

The pivoting action simultaneously allows the L-shaped component 6 to be immobilized with respect to the housing 5, and the post 2 to be immobilized with respect to the fixing device 1, at the desired height.

Indeed, the cam-shaped profiles 20 of the lever 7 clamp the component 6 against the wall 10 so that the striations of this component 6 and of this wall 10 are held in mutual engagement, this allowing the component 6 to be immobilized perfectly relative to the housing 5, and allowing the jaw to be held clamped on the longitudinal member 3. The part 9b of the pad 9 ensures that this longitudinal member 3 is immobilized in this jaw.

The lever 7 coming to the end of its pivoting travel allows the profiled part 22 of its central wall 21 to clamp the post 2 between it and the part 9a of the pad 9, this allowing the post 2 to be immobilized perfectly relative to the device 1.

The invention thus provides a fixing device which can easily and quickly be fitted to any type of support, which is easy and quick to adjust and which makes it possible to mount the post 2 on the support 3 in an entirely reliable manner.

I claim:

1. A device for fixing an object to a support, comprising:
   - a housing having a first wall that defines a channel and a second wall extending from the first wall at an angle;
   - a member having a first section that defines a hole and a second section extending from the first section at an angle, the member being disposed relative to the housing such that the channel and the hole form a contiguous passage; and
   - a lever pivotally attached to the housing and movable between a nonobstructing position wherein the first section of the member is movable along the first wall of the housing and the object is movable through the passage, and a locked position wherein the first section of the member is secured to the first wall of the housing and the object is locked in position within the passage.

2. A device according to claim 1, wherein the lever is pivotally attached to the housing with a screw.

3. A device according to claim 2, wherein the first and second walls of the housing are perpendicular to one another.

4. A device according to claim 2, wherein the first and second sections of the member form an angle of less than 90° with one another.

5. A device according to claim 4, wherein the lever includes a pair of cam-shaped sections and a central wall having a channel shaped cross-section, such that when the lever is in the non-obstructing position the cam-shaped sections are disposed adjacent the first section of the member and the central wall is spaced from the object, and when the lever is in the locked position the cam-shaped sections clamp the first section of the member against the first wall of the housing and the central wall engages the object.

6. A device according to claim 5, wherein the first section of the member and the first wall of the housing include engageable striations which define a series of stable portions of the member relative to the first wall of the housing.

7. A device according to claim 6, wherein the first and second sections of the member are engageable with the support.

8. A device according to claim 7, wherein the second wall of the housing defines an elongated aperture and the first section of the member extends through the elongated aperture.

9. A device according to claim 8, further comprising an elastic pad having a high coefficient of friction that extends through a hole in the second wall of the housing.

10. A device according to claim 9, wherein the elastic pad includes an exterior end part and an interior end part, such that, when the lever is in the locked position, the exterior end part and the first and second sections of the member engage the support, and the object is sandwiched between the central wall of the lever and the interior end part.

11. A method of fixing an object to a support, comprising:
aligning a channel defined in a first wall of a housing with a hole defined in a first section of a member to form a passage;
extending the object through the passage;
moving the first section of the member through an elongated aperture defined in a second wall of the housing;
mounting the member and the housing on the support; and
pivoting a lever between a nonobstructing position wherein the first section of the member is movable along the first wall of the housing and the object is movable through the passage, and a locked position wherein the first section of the member is secured to the first wall of the housing and the object is locked in position within the passage.

12. A method according to claim 11, further comprising pivotally attaching the lever to the housing with a screw.

13. A method according to claim 12, further comprising clamping the first section of the member against the first wall of the housing with a pair of cam-shaped sections of the lever, and engaging a central wall of the lever with the object, when the lever is in the locked position.

14. A method according to claim 13, further comprising extending an elastic pad having an exterior end part and an interior end part through a hole in the second wall of the housing.

15. A method according to claim 14, further comprising engaging the exterior end part of the elastic pad, the first section of the member, and a second section of the member with the support, and engaging the interior end part of the elastic pad and the central wall of the lever with the object when the lever is in the locked position.

* * * * *